(12) United States Patent
Dang et al.

(10) Patent No.: US 8,935,576 B2
(45) Date of Patent: Jan. 13, 2015

(54) AUTOMATED CABLING PROCESS FOR A COMPLEX ENVIRONMENT

(75) Inventors: Tu T. Dang, Cary, NC (US); Michael C. Elles, Apex, NC (US); Jeffery M. Franke, Apex, NC (US); James A. O'Connor, Ulster Park, NY (US); Alan D. Seid, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 13/008,582

(22) Filed: Jan. 18, 2011

(65) Prior Publication Data

US 2012/0185624 A1 Jul. 19, 2012

(51) Int. Cl.
*G06F 11/00* (2006.01)
*G06F 13/40* (2006.01)

(52) U.S. Cl.
CPC .................................... *G06F 13/40* (2013.01)
USPC ........................................................ 714/43

(58) Field of Classification Search
CPC . G06F 13/40; G06F 13/4063; G06F 13/4068; H05K 7/1438; H05K 7/1455; H05K 7/1491
See application file for complete search history.

(56) References Cited

U.S. PATENT DOCUMENTS

| 7,337,227 | B1  |   | 2/2008  | Hsieh et al.      |
|-----------|-----|---|---------|-------------------|
| 7,500,032 | B2  |   | 3/2009  | Kim et al.        |
| 2004/0065470 | A1 | * | 4/2004  | Goodison et al. ............. 174/112 |
| 2005/0111491 | A1 |   | 5/2005  | Caveney           |
| 2007/0117444 | A1 |   | 5/2007  | Caveney et al.    |
| 2007/0195711 | A1 |   | 8/2007  | Morris et al.     |
| 2007/0293236 | A1 |   | 12/2007 | Cox et al.        |
| 2009/0204729 | A1 |   | 8/2009  | Best et al.       |

OTHER PUBLICATIONS

Brand-Rex MillenniuM Cabling Solutions, pp. 1-16, May 3, 2002.*

* cited by examiner

*Primary Examiner* — Michael Maskulinski
(74) *Attorney, Agent, or Firm* — Yee & Associates, P.C.; Lisa J. Ulrich

(57) ABSTRACT

A method is provided for cabling a plurality of hardware components. A chassis controller establishes a wireless connection to a wireless device. The chassis controller, via a wireless interface, transmits a chassis map to the wireless device over the wireless connection. The chassis controller, via the wireless interface, transmits to the wireless device, an indication of a first port to be cabled over the wireless connection, the first port. The first port is of a first hardware component of the plurality of hardware components. The chassis controller tests the first port to determine whether cabling of the first port has been performed correctly.

23 Claims, 7 Drawing Sheets

AUTOMATED CABLING PROCESS FOR A COMPLEX ENVIRONMENT

BACKGROUND

1. Field

The disclosure relates generally to a computer implemented method, a data processing system, and a computer program product for an automated cabling process. More specifically, the disclosure relates to a computer implemented method, a data processing system, and a computer program product for an automated cabling process for a complex computing environment.

2. Description of the Related Art

A server is hardware that makes available file, database, printing, facsimile, communications, or other services to client terminals/stations with access to the network the server serves. When the server permits client/terminal station access to an external communications network, it is sometimes known as a gateway. Servers are available in different sizes, shapes and varieties. Servers may be distributed throughout a network, or they may be concentrated in centralized data centers.

A rack server, also called a rack-mounted server, is a computer dedicated to use as a server and designed to be installed in a framework called a rack. The rack contains multiple mounting slots called bays, each designed to hold a hardware unit secured in place with screws. A rack server has a low-profile enclosure.

A single rack can contain multiple servers stacked one above the other, consolidating network resources and minimizing the required floor space. In an equipment rack filled with servers, a special cooling system is necessary to prevent excessive heat buildup that would otherwise occur when many power-dissipating components are confined in a small space. Multiple servers within the rack system are cabled together using a variety of ports located on the multiple servers. Any given server may have multiple connections to a system controller, as well as other servers within the rack system.

SUMMARY

According to on illustrative embodiment, a method is provided for cabling a plurality of hardware components. A chassis controller establishes a wireless connection to a wireless device. The chassis controller, via a wireless interface, transmits a chassis map to the wireless device over the wireless connection. The chassis controller via the wireless interface, transmits to the wireless device, an indication of a first port to be cabled over the wireless connection, the first port. The first port is of a first hardware component of the plurality of hardware components. The chassis controller tests the first port to determine whether cabling of the first port has been performed correctly.

Another illustrative embodiment provides a method for cabling a plurality of hardware components. A wireless device establishes a wireless connection to a chassis controller via a wireless interface. The wireless device receives a chassis map of a plurality of hardware components. The wireless device displays the chassis map within a user interface of the wireless device. The wireless device receives an indication of a first port to be cabled. The first port is of a first hardware component of the plurality of hardware components. The wireless device visually indicating the first port on the chassis map by a highlighting, flashing, or combination thereof of the first port in the chassis map.

Another illustrative embodiment provides a computer program product for cabling a plurality of hardware components. The computer program product comprises one or more computer-readable, tangible storage devices. Program instructions are stored on at least one of the one or more storage devices. The program instructions establish a wireless connection to a wireless device. The program instructions transmit a chassis map to the wireless device over the wireless connection. The program instructions transmit to the wireless device, an indication of a first port to be cabled over the wireless connection, wherein the first port is of a first hardware component of the plurality of hardware components. The program instructions test the first port to determine whether cabling of the first port has been performed correctly.

Another illustrative embodiment provides a computer system for cabling a plurality of hardware components. The computer system comprises one or more processors, one or more computer-readable memories and one or more computer-readable, tangible storage devices. Program instructions are stored on at least one of the one or more storage devices for execution by at least one of the one or more processors via at least one of the one or more memories. The program instructions establish a wireless connection to a wireless device. The program instructions transmit a chassis map to the wireless device over the wireless connection. The program instructions transmit to the wireless device, an indication of a first port to be cabled over the wireless connection, the first port, wherein the first port is of a first hardware component of the plurality of hardware components. The program instructions test the first port to determine whether cabling of the first port has been performed correctly.

DETAILED DESCRIPTION

Figure 1:
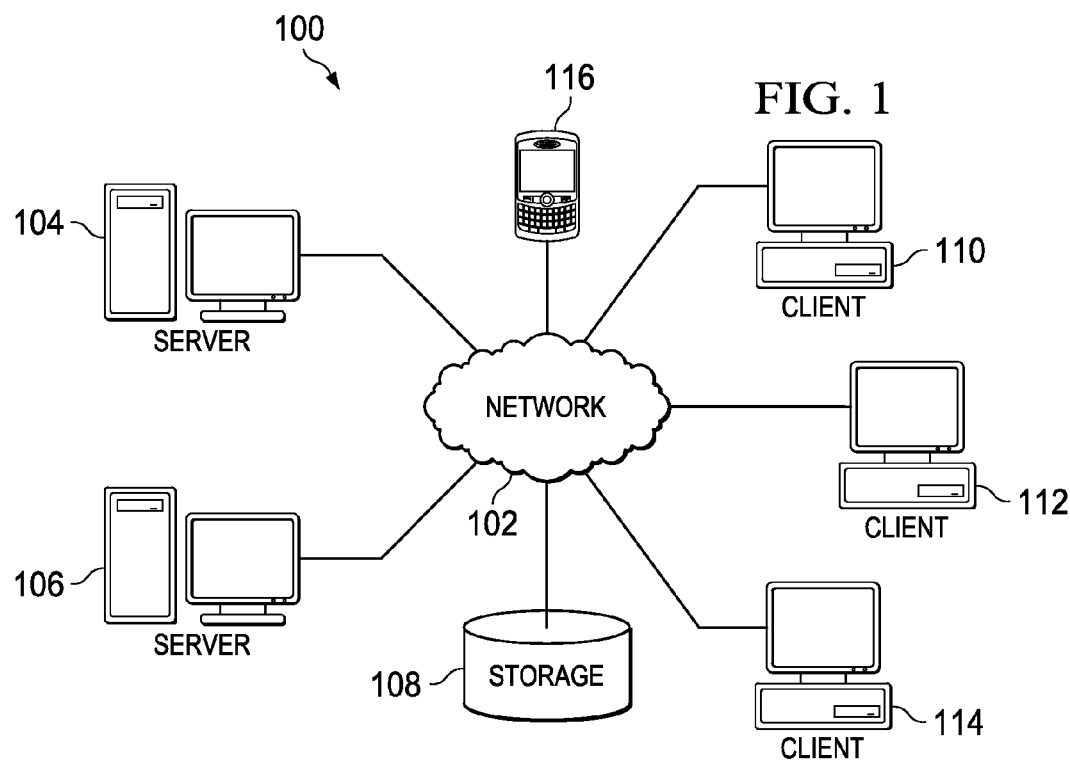
FIG. 1 is an illustration of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage devices may be utilized. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device. The term "computer-readable storage device" does not include a signal propagation media such as a copper transmission cable, an optical transmission fiber and a wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example.

Personal digital assistant (PDA) 116 communicates with client computers 110, 112, and 114 as well as server computer 104 and server computer 106 either wirelessly, or over network 102 by connecting to a wireless network access. PDA 116 can be, for example, but not limited to, a cellular telephone, a tablet computer, or a smart phone. Network data processing system 100 may include additional server computers, client computers, and other devices not shown.

Program code located in network data processing system 100 may be stored on a computer readable storage device and downloaded to a data processing system or other device for use. For example, program code may be stored on a computer readable storage device on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
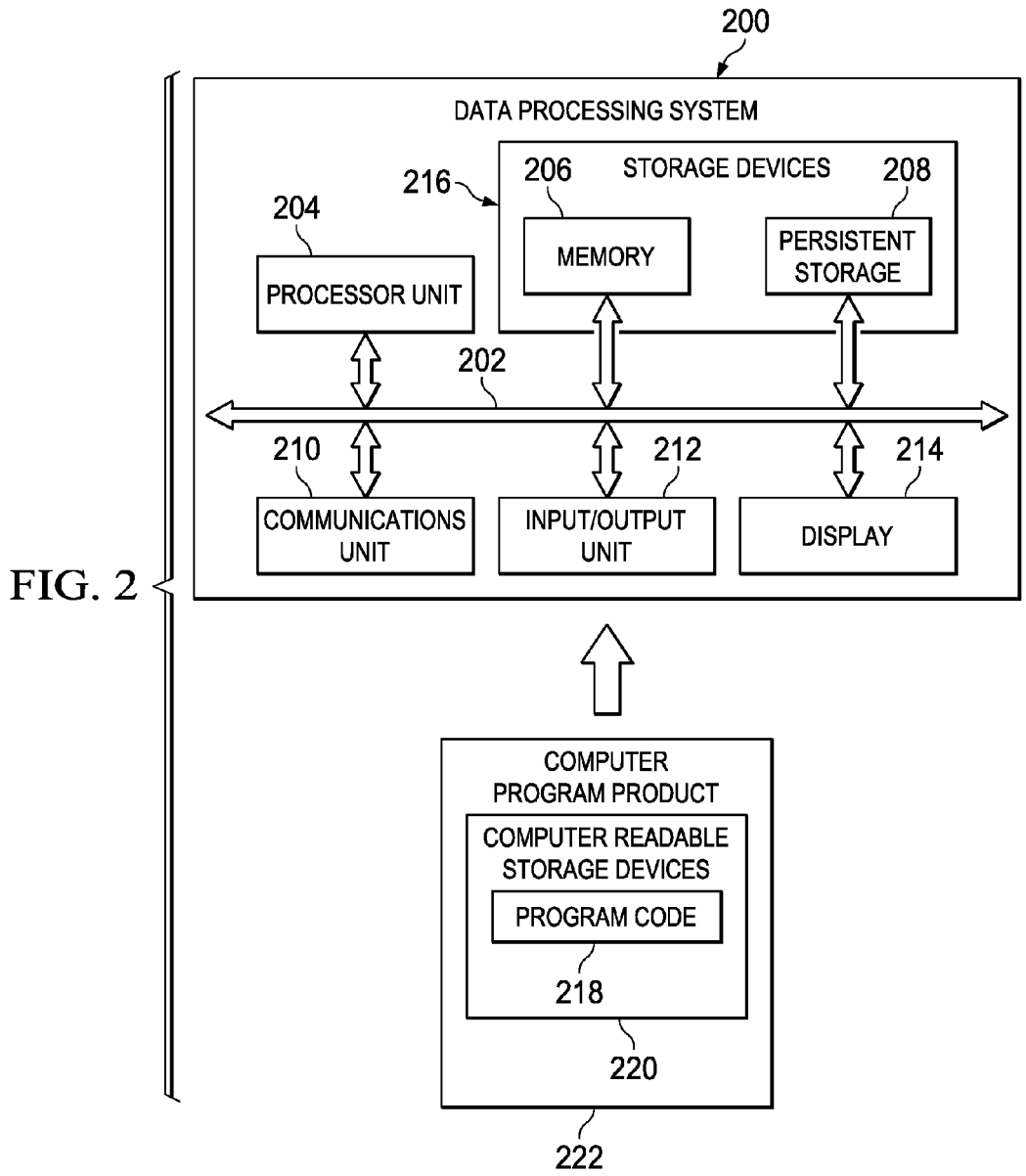
FIG. 2 is an illustration of a data processing system in accordance with an illustrative embodiment.

Turning now to FIG. 2, an illustration of a data processing system is depicted in accordance with an illustrative embodiment. Data processing system 200 is an example of servers 104 and 106 and clients 110, 112, and 114 of FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for an operating system, applications, and/or programs may be located in one or more of storage devices 216. Storage devices 216 are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using program instructions, which may be located in a memory, such as memory 206.

These program instructions are also referred to as program code, computer usable program instructions, or computer readable program instructions that may be read and executed by processor unit 204. The program code in the different embodiments may be embodied on different physical or computer readable storage devices, such as memory 206 or persistent storage 208.

Program code 218 is located in a functional form on one or more of computer readable storage devices 220. Program code 218 can implement processes of exemplary embodiments of the invention. Computer readable storage devices 220 may be selectively removable and may be loaded onto or transferred to data processing system 200 for execution by processor unit 204. Program code 218 and computer readable storage devices 220 form computer program product 222 in these examples. In some instances, one or more of computer readable storage devices 220 may not be removable from data processing system 200.

Alternatively, program code 218 may be transferred to data processing system 200 from computer readable storage devices 220 through a communications link to communications unit 210 and/or through a connection to input/output unit 212. The communications link and/or the connection may be physical or wireless in the illustrative examples.

In some advantageous embodiments, program code 218 may be downloaded over a network to persistent storage 208 from another device or data processing system for use within data processing system 200. For instance, program code stored in a computer readable storage device in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable storage devices 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
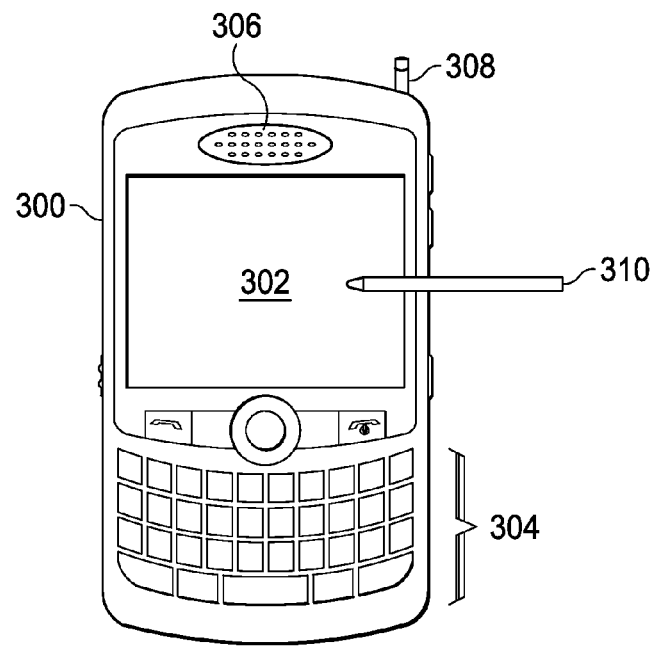
FIG. 3 is a diagram of a client in the form of a personal digital assistant (PDA) in accordance with an illustrative embodiment.

With reference now to FIG. 3, a diagram of a client in the form of a personal digital assistant (PDA) is depicted in accordance with an illustrative embodiment. PDA 300 is an example of PDA 116 of FIG. 1. PDA 300 includes display 302 for presenting textual and graphical information. Display 302 may be a known display device, such as a liquid crystal display (LCD) device. The display may be used to present a map or directions, calendar information, a telephone directory, or an electronic mail message. In these examples, display 302 may receive user input from an input device such as, for example, stylus 310.

PDA 300 may also include keypad 304, speaker 306, and antenna 308. PDA 300 may receive user input from keypad 304 as well as from display 302. Speaker 306 provides a mechanism for audio output, such as audio output from an audio file. Antenna 308 provides a mechanism used in establishing a wireless communications link between PDA 300 and a network, such as network 102 in FIG. 1.

PDA 300 also preferably includes a graphical user interface that may be implemented by means of systems software residing in computer readable media in operation within PDA 300.

Figure 4:
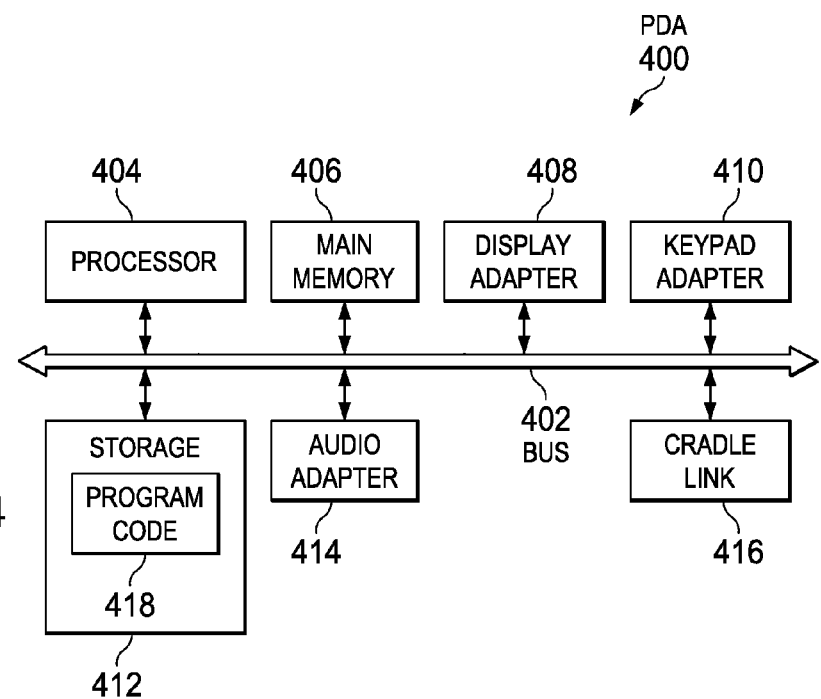
FIG. 4 is a block diagram of a PDA in accordance with an illustrative embodiment.

Turning now to FIG. 4, a block diagram of a PDA is shown in accordance with an illustrative embodiment. PDA 400 is an example of a PDA, such as PDA 300 in FIG. 3, in which program code or program instructions implementing processes of exemplary embodiments of the invention may be located. PDA 400 includes bus 402 to which processor 404 and main memory 406 are connected. Display adapter 408, keypad adapter 410, storage 412, and audio adapter 414 also are connected to bus 402. Cradle link 416 provides a mechanism to connect PDA 400 to a cradle used in synchronizing data in PDA 400 with another data processing system. Further, display adapter 408 also includes a mechanism to receive user input from a stylus when a touch screen display is employed.

An operating system runs on processor 404 and is used to coordinate and provide control of various components within PDA 400 in FIG. 4. The operating system may be, for example, a commercially available operating system such as Windows CE™. Windows CE is a trademark of Microsoft Corporation in the United States, other countries, or both. Instructions for an operating system, applications, or programs such as program code 418 may be located on one or more computer readable storage devices, such as storage 412, for execution by one or more processors, such as processor 404, via one or more computer readable memories, such as main memory 406. Program code 418 can implement processes of exemplary embodiments of the invention.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4.

Cabling together the various servers for a complex system, or especially a group of complex systems can be very difficult and confusing. Keeping track of cables connecting to the various ports of a multitude of servers using paper connectivity maps could be disastrous should the paper connectivity map be misplaced. Furthermore, a failing cable in a complex system is difficult to track down and replace.

The illustrative embodiments described herein provide an interactive cabling process for cabling a complex system. A computer implemented method is provided for cabling a server architecture. A chassis controller establishes wireless connection to a wireless device. The chassis controller transmits a chassis map to the wireless device over the wireless connection. The chassis controller transmits an indication of a first port of the server architecture to be cabled to the wireless device over the wireless connection. The chassis controller tests the first port to determine whether cabling of the first port has been performed correctly.

Figure 5:
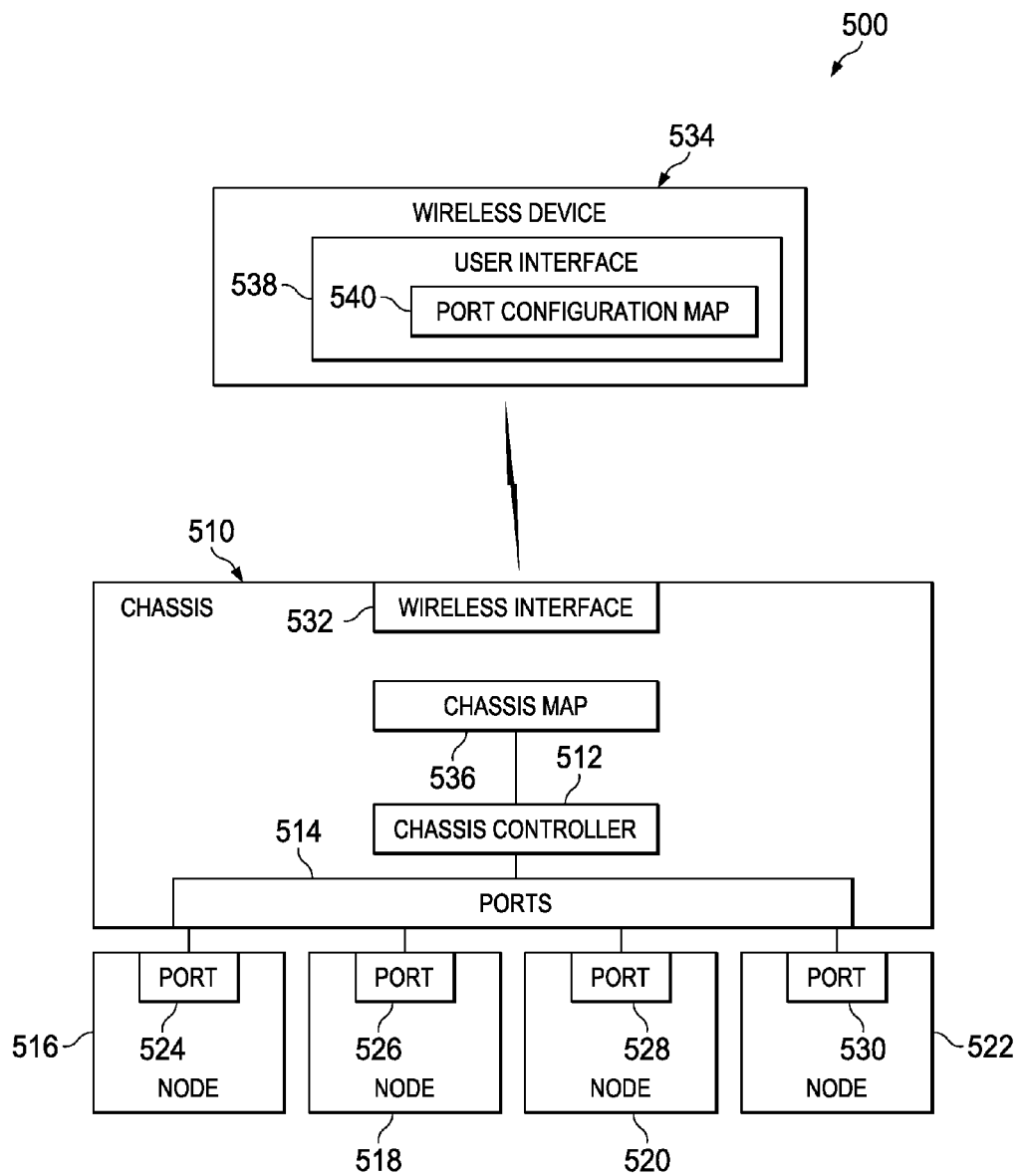
FIG. 5 is a dataflow for an interactive cabling diagnostic according to an illustrative embodiment.

Referring now to FIG. 5, a dataflow for an interactive cabling diagnostic according to an illustrative embodiment is shown. Server architecture 500 can be implemented within a rack server system, which can include, for example, one of server computer 104 or server computer 106 of FIG. 1.

Chassis 510 is a receptacle that server blades, compute nodes, storage nodes, management nodes, switch nodes, and power nodes can be plugged into and cabled. Chassis 510 can provide network access, power, and cooling for multiple servers.

Chassis 510, shown in FIG. 5, is a single chassis only for illustrative purposes. It is to be understood that chassis 510 can be implemented in a rack that can have multiple chassis therein. Similarly, multiple racks can also be interconnected, and each rack can have multiple chassis therein.

Chassis 510 includes chassis controller 512. Chassis controller 512 is a system management processor. Chassis controller 512 allows remote monitoring of servers within a server cluster. Chassis controller 512 enforces chassis-wide policies, such as, but not limited to, thermal management and diagnostics.

In one illustrative embodiment, chassis controller 512 may exist outside of a given chassis, such as chassis 510 that performs cabling diagnostics and contains a chassis map, such as chassis map 536. Additionally, because chassis controller 512 is capable of monitoring multiple chassis, not all chassis or servers within a server cluster are required to contain a chassis controller, such as chassis controller 512. Thus, while not every chassis or server is required to have a separate chassis controller, such as chassis controller 512, each chassis or server is required to communicate with at least one chassis controller.

Chassis 510 includes set of ports 514. Set of ports 514 can include one or more ports. Each port of set of ports 514 is a hardware port and specialized outlet on chassis 510 to which a plug or cable connects. Each port of set of ports 514 serves as an interface between chassis 510 and other computers or peripheral devices, such as node 516, node 518, node 520, and node 522. Set of ports 514 can also serve as an interface between chassis 510 and other chassis.

Each of node 516, node 518, node 520, and node 522 is any substantially self-contained device with a connection point such as, for example, a server, a storage device, a network switch, a hub, a blade, or a client, and is cabled into server architecture 500. Each of node 516, node 518, node 520, and node 522 can alternatively be, for example, but not limited to, a rack server computer, a file server, a print server, a domain controller, a messaging server, a storage server, a firewall server, a cache server, a virtual private network server, an uninterruptible power supply unit, and a power distribution unit.

Nodes 516, 518, 520, and 522 include ports 524, 526, 528, and 530, respectively. Each of ports 524-530 is a hardware port and specialized outlet to which a plug or cable connects. Each of ports 524-530 serves as an interface between an associated one of nodes 516-522 and chassis 510. Ports 524-530 allow node 516, node 518, node 520, and node 522 to be cabled to set of ports 514 of chassis 510.

Chassis 510 includes wireless interface 532. Wireless interface 532 is an interface device that allows for wireless communication between chassis 510 and wireless device 534. Wireless interface 532 can be an integrated interface, such as a network interface card or a wireless access point. Wireless interface 532 can be a removable interface, such as a wireless network interface controller, a bluetooth interface controller, or other short range wireless interfacing devices. Wireless interface 532 can also be a terminal adapter for a cellular network that allows for wireless communication between chassis 510 and wireless device 534 utilizing a cellular radio system.

Chassis 510 includes chassis map 536. Chassis map 536 is a graphical rendering of the relative physical layout of set of ports 514. Wireless device 534 can be PDA 300 of FIG. 3. Wireless device 534 includes user interface 538. User interface 538 is a user interface that allows users to interact with a program, such as program code 418 of FIG. 4 utilizing images rather than text commands. User interface 538 can include graphical icons and visual indicators to represent information and actions available to a user. User interface 538 can be, for example, a graphical user interface or a web user interface.

User interface 538 displays port configuration map 540. Port configuration map 540 is an interactive map that graphically guides a user through the cabling of set of ports 514 to ports 524-530. Port configuration map 540 retrieves chassis map 536 from chassis 510. Port configuration map 540 therefore can display the relative physical layout of set of ports 514. Port configuration map 540 also receives an indication of the relative physical layout of ports 524-530. Port configuration map 540 can receive the indication of the relative physical layout of ports 524-530 wirelessly, such as from a communication from the various ones of nodes 516-522 through chassis controller 512 and wirelessly communicated through wireless interface 532.

Port configuration map 540 can also receive the indication of the relative physical layout of ports 524-530 via a user selection within user interface 538. A user can select a form of the indication of a particular node. The form of the indication can be, for example, a serial number of the node, a media access control address of the node, a model number, or other form from which a port configuration of the nodes can be determined. Alternatively, port configuration map 540 can identify the relative physical layout of ports 524-530 by identifying nodes 516-522 within a database containing port maps of the relative physical layout of ports 524-530. The database can be implemented as a database within wireless device 534 or can be accessed on a remote storage, such as storage 108 of FIG. 1.

When cabling is being set up between set of ports 514 of chassis 510 and ports 524, 526, 528, and 530 of nodes 516, 518, 520, and 522, respectively, wireless interface 532 connects to wireless device 534. Chassis controller 512 communicates to wireless device 534 which ports of set of ports 514 are to be connected to ports 524-530. In one illustrative embodiment, port configuration map 540 displays a graphical rendering of the relative physical layout of set of ports 514. Port configuration map 540 indicates which port of set of ports 514 is desired to be cabled by highlighting, flashing, or otherwise visually indicating the desired port of set of ports 514.

When the desired port of set of ports 514 has been cabled, port configuration map 540 can display a graphical rendering of the relative physical layout of one of ports 524-530. Port configuration map 540 indicates which of the one of ports 524-530 is desired to be cabled by highlighting, flashing, or otherwise visually indicating the desired port of ports 524-530.

In one illustrative embodiment, in response to cabling a port of set of ports 514 to one of ports 524-530, chassis controller 512 performs a handshake or phaselock loop to determine that the cabling has been performed correctly. If the port of set of ports 514 has been correctly cabled to the one of ports 524-530, chassis controller 512 can continue the setup by signaling to wireless device 534 a next port of set of ports 514 to be cabled. However, if the port of set of ports 514 has been incorrectly cabled to the one of ports 524-530, chassis controller 512 can signal the mistake to wireless device 534. Port configuration map 540 can then display the incorrect cabling and indicate the corrections that should be performed.

Figure 6:
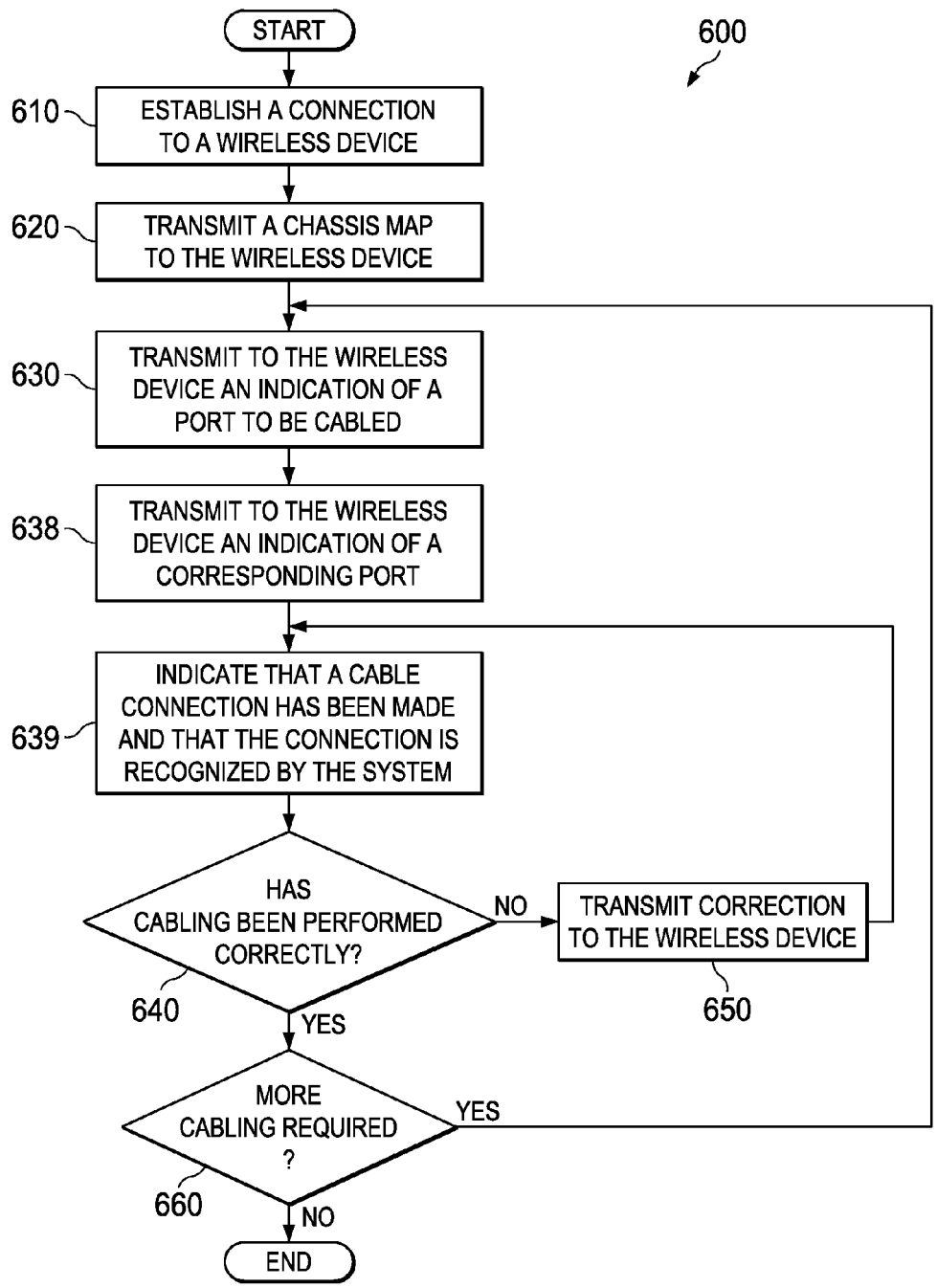
FIG. 6 is a flowchart of a method for signaling an interactive cabling diagnostic to a wireless device according to an illustrative embodiment.

Referring now to FIG. 6, a flowchart of a method for signaling an interactive cabling diagnostic to a wireless device according to an illustrative embodiment is shown. Process 600 is a hardware or firmware process, executing on a hardware or firmware component, such as chassis controller 512 of FIG. 5.

Process 600 begins by the chassis controller establishing a connection to a wireless device (step 610). The wireless device can be, for example, wireless device 534 of FIG. 5. In one illustrative embodiment, the chassis controller can establish the connection to the wireless device utilizing a short-range transmission protocol. These short-range transmissions may take various forms, such as, for example, very low power radio frequency (RF), wireless fidelity (Wi-Fi), or Bluetooth. Wi-Fi refers to a set of I.E.E.E. standards for wireless transmissions, such as 802.11a and 802.11b. Bluetooth is a wireless personal area network (PAN) technology from the Bluetooth Special Interest Group. Bluetooth is an open standard for short-range transmission of digital voice and data between, for example, mobile devices (such as laptops, PDAs, phones) and desktop devices. The Bluetooth standard supports point-to-point and multipoint applications. In one illustrative embodiment, the chassis controller can establish the connection to the wireless device utilizing a terminal adapter for a cellular network that allows for wireless communication between a chassis, such as chassis 510 of FIG. 5, and the wireless device, utilizing a cellular radio system.

Responsive to establishing a connection to the wireless device, the chassis controller transmits a chassis map to the wireless device (step 620). The chassis map can be, for example, chassis map 536 of FIG. 5. The chassis map is a graphical rendering of the relative physical layout of a set of ports within a chassis, such as set of ports 514 of chassis 510 of FIG. 5.

The chassis controller transmits to the wireless device an indication of a port to be cabled (step 630). The port to be cabled can be, for example, a port of set of ports 514 located on chassis 510, or one of ports 524-530 located on one of nodes 516-522 of FIG. 5, respectively. A port configuration map on the wireless device can then indicate to a user of the wireless device, the port to be cabled by highlighting, flashing, or otherwise visually indicating the port to be cabled.

The chassis controller transmits to the wireless device an indication of a corresponding port (step 638). The corresponding port receives the other end of the cable connected in steps 630-638 above. The corresponding port can be, for example, a port of set of ports 514 located on chassis 510, or one of ports 524-530 located on one of nodes 516-522 of FIG. 5, respectively. The port configuration map on the wireless device can then indicate, to a user of the wireless device, the corresponding port by highlighting, flashing, or otherwise visually indicating the port to be cabled.

In response to the cable being connected to the corresponding port, the chassis controller indicates that a cable connection has been made and that the connection is recognized by the system (step 639). An indication that the cable connection was made can be, for example, automatically detected by the system. Alternatively, the indication that the cable connection was made can be in response to a user input into a wireless device, such as wireless device 534 of FIG. 5, that the appropriate connection has been made.

The chassis controller determines whether the cabling has been performed correctly (step 640). In one illustrative embodiment, the chassis controller transmits a test to the most recently cabled port to determine whether the cabling has been performed correctly. In one illustrative embodiment, the chassis controller tests the most recently cabled port by performing a handshake or phaselock loop to determine that the cabling has been performed correctly. In one illustrative embodiment, the chassis controller can check not only the most recently cabled port but also all other ports that were previously cabled. During the cabling of the most recently cabled port, other cables may have been inadvertently dislodged from their ports. Therefore, the chassis controller may desire to check each cabled port each time a new connection is made.

Responsive to determining that the cabling has not been performed correctly ("no" at step 640), the chassis controller transmits a correction to the wireless device (step 650). The correction can indicate, for example, that a particular cable should be removed from a particular port. The correction can also indicate into a correct port into which the cable should be inserted. The correct port can be, for example, one of set of ports 514 located on chassis 510 or one of ports 524-530 located on one of nodes 516-522 of FIG. 5. The port configuration map on the wireless device can then indicate the correct port by highlighting, flashing, or otherwise visually indicating the correct port. The chassis controller can then iterate back to step 639 to indicate that a cable connection has been made and that the connection is recognized by the system.

Returning now to step 640, responsive to determining that the cabling has been performed correctly ("yes" at step 640), the chassis controller determines whether more cabling is required for the set up (step 660). Responsive to determining that more cabling is required for the set up ("yes" at step 660), the chassis controller iterates back to step 630, and transmits to the wireless device an indication of a next port to be cabled. Responsive to determining that more cabling is not required for the set up ("no" at step 660), the chassis controller terminates process 600.

Figure 7:
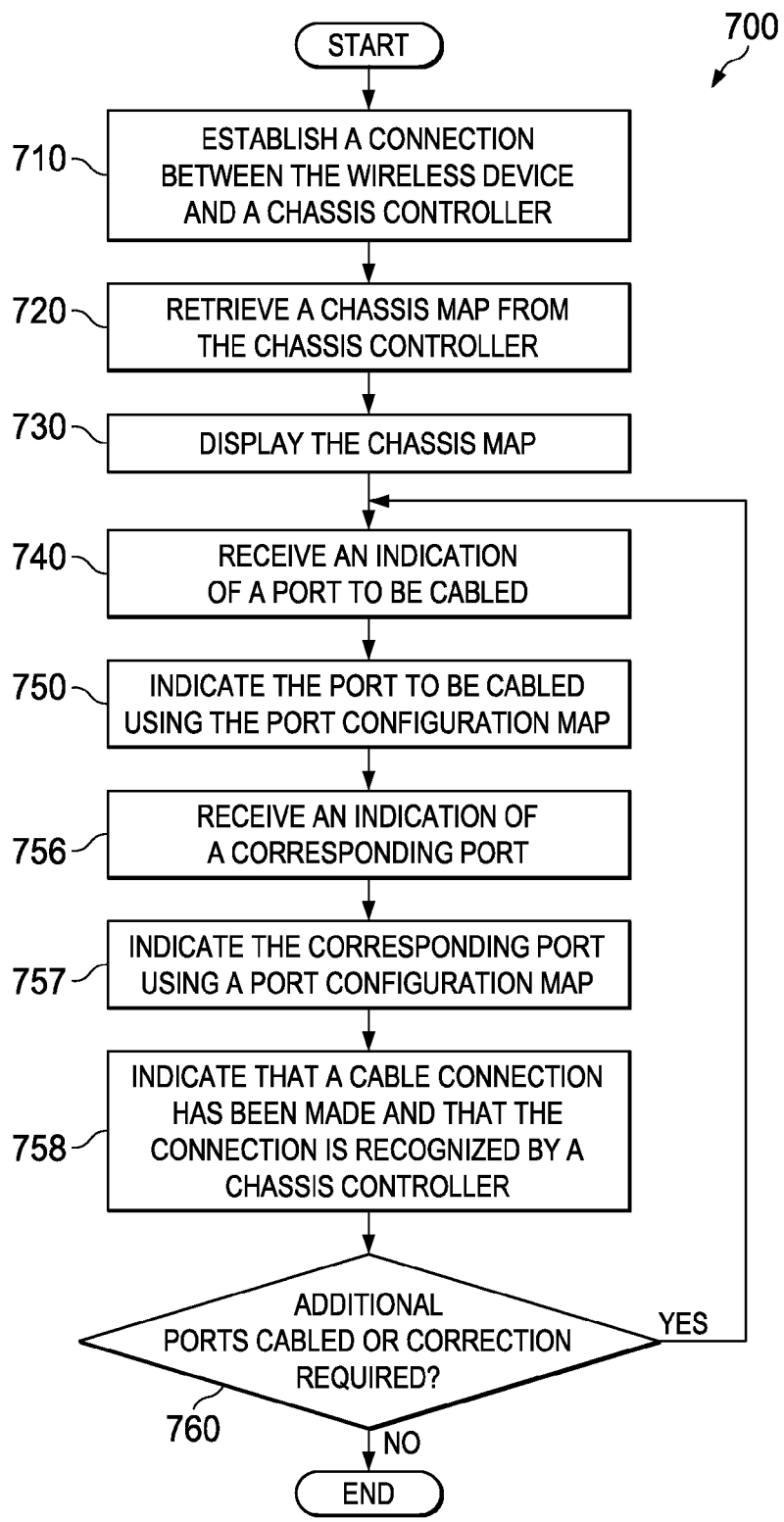
FIG. 7 is a flowchart of a method for receiving and displaying an interactive cabling diagnostic on a wireless device according to an illustrative embodiment.

Referring now to FIG. 7, a flowchart of a method for receiving and displaying an interactive cabling diagnostic on a wireless device according to an illustrative embodiment is shown. The wireless device can be, for example, PDA 300 of FIG. 3, PDA 400 of FIG. 4, or wireless device 534 of FIG. 5. Process 700 is a software process executing on a processor, such as processor 404 of FIG. 4. Program code, such as program code 418 of FIG. 4, within PDA 400 of FIG. 4, can perform the steps of process 700.

Process 700 begins by the processor executing program code to establish a connection between the wireless device and a chassis controller (step 710). The chassis controller can be, for example, chassis controller 512 of FIG. 5. In one illustrative embodiment, the processor can establish the connection between the chassis controller and the wireless device via a wireless interface, such as wireless interface 532 of FIG. 5, utilizing a short-range transmission protocol. These short-range transmissions may take various forms, such as, for example, very low power radio frequency (RF), wireless fidelity (Wi-Fi), or Bluetooth. In one illustrative embodiment, the processor can establish the connection between the chassis controller and the wireless device via the wireless interface utilizing a terminal adapter for a cellular network that allows for wireless communication between the chassis controller and the wireless device utilizing a cellular radio system.

The processor then executes program code to retrieve a chassis map from the chassis controller (step 720). The chassis map may be, for example, chassis map 536 of FIG. 5. The chassis map is a graphical rendering of the relative physical layout of a set of ports within a chassis, such as set of ports 514 of chassis 510 of FIG. 5.

The processor then executes program code to display the chassis map (step 730). The chassis map is displayed within a user interface of the wireless device, such as display 302 of FIG. 3.

Next, the processor executes program code to receive an indication of a port to be cabled (step 740). The port to be cabled can be, for example, a port of set of ports 514 located on chassis 510 or one of ports 524-530 located on one of nodes 516-522 of FIG. 5. The processor executes program code to indicate the port to be cabled using a port configuration map (step 750), such as port configuration map 540 of FIG. 5. The port is indicated within the port configuration map, utilizing a user interface, such as graphical user interface 538 of FIG. 5. The port configuration map can indicate which of the various ports is to be cabled by highlighting, flashing, or otherwise visually indicating the port to be cabled.

Next, the processor executes program code to receive an indication of a corresponding port (step 756). The corresponding port receives the other end of the cable connected in steps 740-750 above. The corresponding port can be, for example, a port of set of ports 514 located on chassis 510 or one of ports 524-530 located on one of nodes 516-522 of FIG. 5. The processor executes program code to indicate the corresponding port using a port configuration map, such as port configuration map 540 of FIG. 5 (step 757). The corresponding port is indicated within the port configuration map, utilizing a user interface, such as user interface 538 of FIG. 5. The port configuration map can indicate which of the various ports is to be cabled by highlighting, flashing, or otherwise visually indicating the port to be cabled.

In response to a cable being connected to the corresponding port, the processor executes program code to indicate that a cable connection has been made and that the connection is recognized by the chassis controller (step 758). An indication that the cable connection was made can be, for example, automatically detected by the chassis controller. Alternatively, the indication that the cable connection was made can be in response to a user input into the wireless device that the appropriate connection has been made.

The processor then executes program code to receive an indication as to whether additional ports are to be cabled or to receive an indication as to whether a correction is required to a cabled port (step 760). Responsive to receiving an indication that additional ports are to be cabled or that a correction is required to a cabled port ("yes" at step 760), the processor executes program code to iterate back to step 740 and to receive a next port to be cabled. Responsive to receiving an indication that additional ports are not to be cabled or that a correction is not required to a cabled port ("no" at step 760), process 700 terminates.

Figure 8:
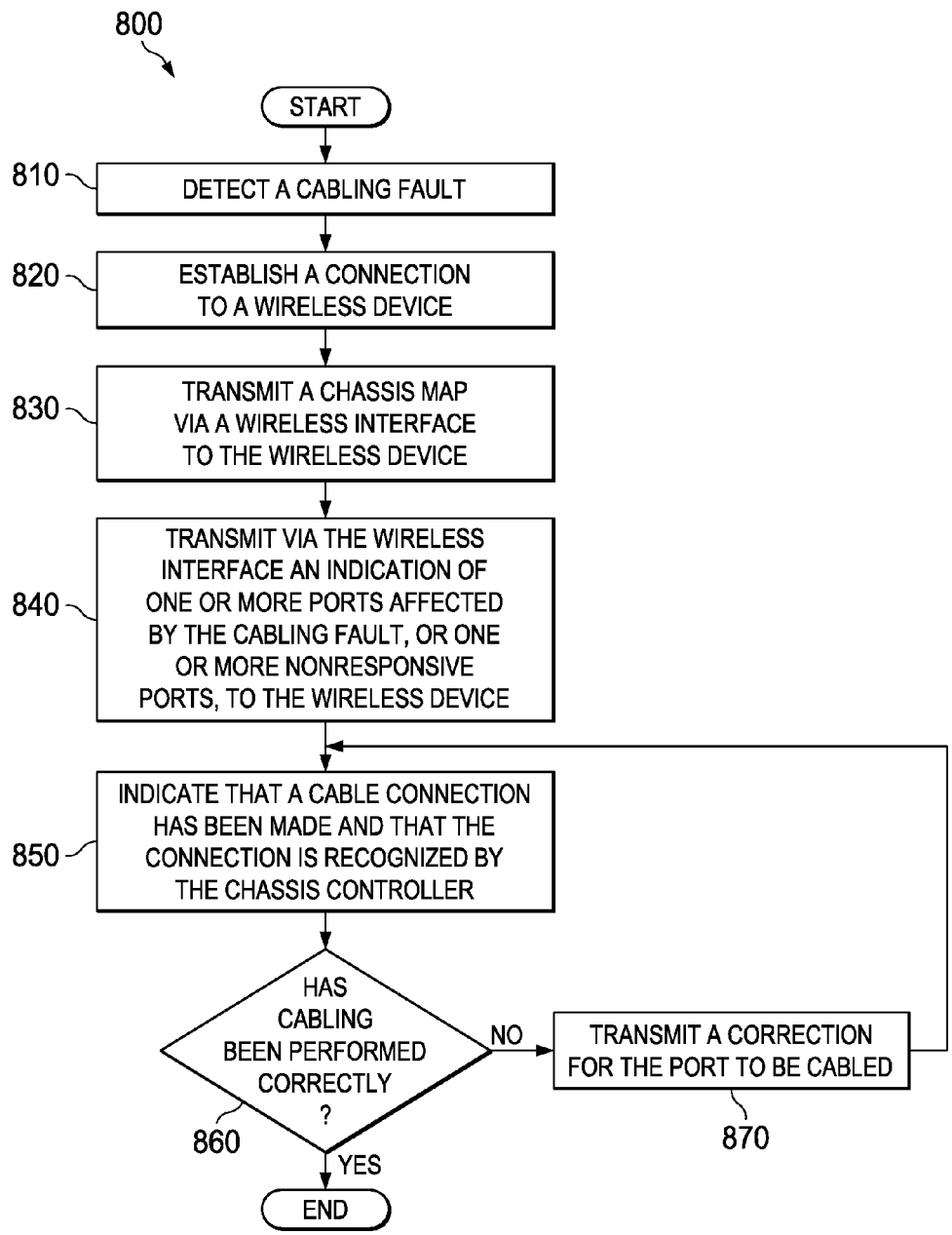
FIG. 8 is a flowchart of a method for identifying and displaying a cable fault during runtime according to an illustrative embodiment.

Referring now to FIG. 8, a flowchart of a method for identifying and displaying a cable fault during runtime. Process 800 is a hardware or firmware process executing on a hardware or firmware component, such as chassis controller 512 of FIG. 5.

Process 800 begins by the chassis controller detecting a cabling fault (step 810). The cabling fault can be due, for example, but not limited to, a cable losing a connection from a port, from a defect occurring within the cable, or the attached node becoming otherwise nonresponsive.

In response to detecting the cabling fault, the chassis controller establishes a connection to a wireless device (step 820). The wireless device can be, for example, PDA 300 of FIG. 3, PDA 400 of FIG. 4, or wireless device 534 of FIG. 5. In one illustrative embodiment, the chassis controller can establish the connection to the wireless device utilizing a short-range transmission protocol. These short-range transmissions may take various forms, such as, for example, very low power radio frequency (RF), wireless fidelity (Wi-Fi), or Bluetooth. In one illustrative embodiment, the chassis controller can establish the connection to the wireless device utilizing a terminal adapter for a cellular network that allows for wireless communication between the chassis controller and the wireless device utilizing a cellular radio system.

Responsive to establishing a connection to the wireless device, the chassis controller transmits a chassis map via a wireless interface to the wireless device (step 830). The chassis map can be, for example, chassis map 536 of FIG. 5. The wireless interface can be, for example, wireless interface 532 of FIG. 5. The chassis map is a graphical rendering of the relative physical layout of a set of ports within a chassis, such as set of ports 514 of chassis 510 of FIG. 5.

The chassis controller transmits via the wireless interface an indication of one or more ports affected by the cabling fault, or one or more nonresponsive ports, to the wireless device (step 840). The nonresponsive ports are those ports connected by the cable subject to the cabling fault. The nonresponsive ports can be, for example, one or more ports of set of ports 514 located on chassis 510 or one or more of ports 524-530 located on one or more of nodes 516-522 of FIG. 5. The port configuration map on the wireless device can then indicate the nonresponsive ports by highlighting, flashing, or otherwise visually indicating the desired port. A system engineer can then replace the cable subject to the cabling fault according to the chassis map.

In response to the cable subject to the cabling fault has being replaced, the chassis controller indicates that a cable connection has been made and that the connection is recognized by the chassis controller (step 850). An indication that the cable connection was made can be, for example, automatically detected by the chassis controller. Alternatively, the indication that the cable connection was made can be in response to a user input into a wireless device that the appropriate connection has been made.

The chassis controller determines whether the cabling has been performed correctly (step 860). In one illustrative embodiment, the chassis controller tests the nonresponsive ports by performing a handshake or phaselock loop to determine that the cabling has been performed correctly. In one illustrative embodiment, the chassis controller can check not only the port that has been most recently cabled, but also all other ports that were previously cabled. During the cabling of the most recent port, other cables may have been inadvertently dislodged from their ports. Therefore, the chassis controller may desire to check each cabled port each time a new connection is made.

Responsive to determining that the cabling has not been performed correctly ("no" at step 860), the chassis controller transmits a correction for a port to be cabled (step 870). The correction can indicate, for example, that a particular cable should be removed from a particular port. The correction could then indicate into which port the cable should be reinserted. The port to be cabled can be, for example, a port of set of ports 514 located on chassis 510 or one of ports 524-530 located on one of the nodes, such as one of nodes 516-522 of FIG. 5. The port configuration map on the wireless device can then indicate which port is to be cabled by highlighting, flashing, or otherwise visually indicating the desired port. Responsive to transmitting a correction for a port to be cabled, the chassis controller iterates back to step 850 to indicate that a cable connection has been made and that the connection is recognized by the chassis controller.

Returning now to step 860, responsive to determining that the cabling has been performed correctly ("yes" at step 860), the chassis controller terminates process 800.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for cabling a plurality of hardware components, the method comprising the steps of:
   establishing, by a system management processor within a chassis containing at least one of the plurality of hardware components, a wireless connection to a wireless device of a service person responsible for cabling the plurality of hardware components;
   transmitting, by the system management processor, a chassis map to the wireless device over the wireless connection;
   transmitting, by the system management processor via the wireless connection, to the wireless device, an indication of a first port to be cabled of a first hardware component of the plurality of hardware components;
   subsequently testing, by the system management processor, the first port to determine whether cabling of the first port has been performed correctly; and
   responsive to a correct performance of the cabling of the first port as determined by the subsequent testing, automatically testing, by the system management processor, at least one adjacent port to determine whether the cabling of the first port inadvertently disconnected cabling of the at least one adjacent port.

2. The method of claim 1, further comprising the steps of:
   responsive to determining, by the system management processor, that (i) the first port has not been correctly cabled to a second port of a second hardware component of the plurality of hardware components, and (ii) a first cable is currently inserted at one end into a third port and at another end into one but not both of the first port and the second port, and in response, transmitting, by the system management processor to the wireless device, a correction indicating that the one end of the first cable should be removed from the third port and inserted into one of the first port and the second port to which the other end is not currently inserted.

3. The method of claim 2, further comprising:
   displaying, by the system management processor, a visual indicator on a display attached to the chassis that the first port has been correctly cabled to a second port of a second hardware component of the plurality of hardware components.

4. The method of claim 1, further comprising the steps of:
   determining, by the system management processor, whether cabling of a second port of a second hardware component of the plurality of hardware components is required;
   responsive to determining that cabling of the second port of the second hardware component is required, transmitting, by the system management processor via the wireless connection, an indication of the second port to the wireless device; and
   subsequently testing, by the system management processor, the second port to determine whether the cabling of the second port has been performed correctly.

5. The method of claim 4, further comprising the steps of:
   retesting, by the system management processor, the first port to determine whether the first port is correctly cabled.

6. The method of claim 1, wherein the wireless connection is established using a wireless protocol selected from the group consisting of: radio frequency, WIFI, and Bluetooth.

7. A method for cabling a plurality of hardware components, the method comprising the steps of:
   establishing, by a wireless device, a wireless connection to a system management processor within a chassis containing at least one of the plurality of hardware components;
   receiving, by the wireless device, a chassis map of the plurality of hardware components;
   displaying, by the wireless device, the chassis map within a user interface of the wireless device;
   receiving, by the wireless device, an indication of a first port to be cabled of a first hardware component of the plurality of hardware components;
   visually indicating the first port on the chassis map by a highlighting, flashing, or combination thereof of the first port in the chassis map; and
   responsive to a correct performance of cabling of the first port as determined by a subsequent testing, automatically testing, by a system management processor, at least one adjacent port to determine whether the cabling of the first port inadvertently disconnected cabling of the at least one adjacent port.

8. The method of claim 7, further comprising:
   receiving, by the wireless device in response to a system management processor determining that (i) the first port has not been correctly cabled to a second port of a second hardware component of the plurality of hardware components, and (ii) a first cable is currently inserted at one end into a third port and at another end into one but not both of the first port and the second port, a correction indicating that the one end of the first cable should be removed from the third port and inserted into one of the first port and the second port to which the other end is not currently inserted.

9. The method of claim 7, further comprising:
   receiving, by the wireless device, an indication over the wireless connection of a second port to be cabled of a second hardware component of the plurality of hardware devices; and visually indicating the second port on the chassis map by a highlighting, flashing, or combination thereof of the second port in the chassis map.

10. The method of claim 7, wherein the wireless connection is established using a wireless protocol selected from the group consisting of radio frequency, WIFI, and Bluetooth.

11. A method for identifying and displaying a cable fault during runtime, the method comprising:
    detecting, by a system management processor within a chassis containing at least one of a plurality of hardware components, a cabling fault;
    responsive to detecting the cabling fault, establishing, by the system management processor, a wireless connection to a wireless device of a service person responsible for fixing the plurality of hardware components;
    transmitting, by the system management processor, a chassis map over the wireless connection to the wireless device;

transmitting, by the system management processor, an indication of a faulting cabled port resulting from the cabling fault;

subsequently indicating, by the system management processor that the faulting cabled port has been recabled to form a working connection; and responsive to a correct performance of cabling of the first port as determined by a subsequent testing, automatically testing, by the system management processor, at least one adjacent port to determine whether the cabling of the first port inadvertently disconnected cabling of the at least one adjacent port.

12. The method of claim 11, further comprising:

responsive to determining, by the system management processor, that (i) the first port has not been correctly cabled to a second port of a second hardware component of the plurality of hardware components, and (ii) a first cable is currently inserted at one end into a third port and at another end into one but not both of the first port and the second port, and in response, transmitting, by the system management processor to the wireless device, a correction indicating that the one end of the first cable should be removed from the third port and inserted into one of the first port and the second port to which the other end is not currently inserted.

13. The method of claim 11, wherein the wireless connection is established using a wireless protocol selected from the group consisting of radio frequency, WIFI, and Bluetooth.

14. A computer program product for cabling a plurality of hardware components, the computer program product comprising:

one or more computer-readable storage devices, and program instructions, stored on the one or more storage devices, the program instructions comprising:

program instructions, stored on at least one of the one or more storage devices, to establish a wireless connection between a system management processor within a chassis containing at least one of the plurality of hardware components and a wireless device of a service person responsible for cabling the plurality of hardware components;

program instructions to transmit a chassis map to the wireless device over the wireless connection;

program instructions to transmit to the wireless device an indication of a first port to be cabled of a first hardware component of the plurality of hardware components;

program instructions to test the first port to determine whether cabling of the first port has been performed correctly; and program instructions to responsive to a correct performance of cabling of the first port as determined by a subsequent testing, automatically test, by the system management processor, at least one adjacent port to determine whether the cabling of the first port inadvertently disconnected cabling of the at least one adjacent port.

15. The computer program product of claim 14, further comprising:

program instructions responsive to determining, by the system management processor, that (i) the first port has not been correctly cabled to a second port of a second hardware component of the plurality of hardware components, and (ii) a first cable is currently inserted at one end into a third port and at another end into one but not both of the first port and the second port, and in response, to transmit, by the system management processor to the wireless device, a correction indicating that the one end of the first cable should be removed from the third port and inserted into one of the first port and the second port to which the other end is not currently inserted.

16. The computer program product of claim 14, further comprising:

program instructions to determine whether cabling of a second port of a second hardware component of the plurality of hardware components is required;

program instructions responsive to determining that more cabling of the second port of the second hardware component is required, to transmit an indication of the second port to the wireless device; and program instructions to subsequently test the second port to determine whether the cabling of the second port has been performed correctly.

17. The computer program product of claim 14, further comprising:

program instructions to retest the first port to determine whether the first port is correctly cabled.

18. The computer program product of claim 14, wherein the program instructions to establish the wireless connection to the wireless device establish the wireless connection using a wireless protocol selected from the group consisting of: radio frequency, WIFI, and Bluetooth.

19. A computer system for cabling a plurality of hardware components, the computer system comprising:

one or more processors, one or more computer-readable memories and one or more computer-readable storage devices, and program instructions, stored on the one or more storage devices for execution by the one or more processors via the one or more memories, the program instructions comprising:

program instructions to establish a wireless connection between a system management processor within a chassis containing at least one of the plurality of hardware components and a wireless device;

program instructions to transmit a chassis map over the wireless connection to the wireless device;

program instructions to transmit to the wireless device an indication of a first port to be cabled of a first hardware component of the plurality of hardware components;

program instructions to test the first port to determine whether cabling of the first port has been performed correctly; and program instructions to responsive to a correct performance of the cabling of the first port as determined by a subsequent testing, automatically test, by the system management processor, at least one adjacent port to determine whether the cabling of the first port inadvertently disconnected cabling of the at least one adjacent port.

20. The computer system of claim 19, further comprising:

program instructions, responsive to determining, by the system management processor, that (i) the first port has not been correctly cabled to a second port of a second hardware component of the plurality of hardware components, and (ii) a first cable is currently inserted at one end into a third port and at another end into one but not both of the first port and the second port, and in response, to transmit, by the system management processor to the wireless device, a correction indicating that the one end of the first cable should be removed from the third port and inserted into one of the first port and the second port to which the other end is not currently inserted.

21. The computer system of claim 19, further comprising:
program instructions to determine whether cabling of a second port of a second hardware component of the plurality of hardware components is required;
program instructions responsive to determining that cabling of the second port of the plurality of hardware components is required, to transmit an indication of the second port to the wireless device; and
program instructions to subsequently test the second port to determine whether the cabling of the second port has been performed correctly.

22. The computer system of claim 19, further comprising:
program instructions to retest the first port to determine whether the first port is correctly cabled.

23. The computer system of claim 19, wherein the program instructions to establish the wireless connection to the wireless device establish the wireless connection using a wireless protocol selected from the group consisting of: radio frequency, WIFI, and Bluetooth.

* * * * *